United States Patent
Homma

(10) Patent No.: US 9,817,736 B2
(45) Date of Patent: Nov. 14, 2017

(54) COMMUNICATION SYSTEM, COMMUNICATION TERMINAL, AND COMPUTER PROGRAM PRODUCT

(71) Applicant: Takeshi Homma, Kanagawa (JP)

(72) Inventor: Takeshi Homma, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/204,290

(22) Filed: Mar. 11, 2014

(65) Prior Publication Data

US 2014/0281728 A1 Sep. 18, 2014

(30) Foreign Application Priority Data

Mar. 14, 2013 (JP) .................................. 2013-052541

(51) Int. Cl.
*G06F 11/22* (2006.01)
(52) U.S. Cl.
CPC ................................ *G06F 11/2294* (2013.01)
(58) Field of Classification Search
CPC .. G06F 11/00; G06F 11/2257; G06F 19/3418; G06F 1/1632
See application file for complete search history.

(56) References Cited

U.S. PATENT DOCUMENTS

| 6,553,774 B1 * | 4/2003 | Ishio ..................... F25B 49/005 340/585 |
| 2002/0026397 A1 * | 2/2002 | Ieta ..................... G06Q 20/4037 705/35 |
| 2005/0154500 A1 * | 7/2005 | Sonnenrein ........... H04L 67/025 701/1 |
| 2006/0092019 A1 * | 5/2006 | Fallon .............. G08B 13/19656 340/541 |
| 2007/0043532 A1 * | 2/2007 | Wiedenberg .......... H04L 69/329 702/183 |

(Continued)

FOREIGN PATENT DOCUMENTS

| JP | 6-284249 | 10/1994 |
| JP | 2001-197152 | 7/2001 |

(Continued)

OTHER PUBLICATIONS

Office Action dated Nov. 8, 2016, in Japanese Patent Application No. 2013-052541.

*Primary Examiner* — Jigar Patel

(74) *Attorney, Agent, or Firm* — Oblon, McClelland, Maier & Neustadt, L.L.P.

(57) ABSTRACT

A plurality of communication terminals communicate via a communication line in a communication system. The communication system includes: a diagnosis unit configured to diagnose a state of a device built in the communication terminal or a device connected to the communication terminal; a management unit configured to manage diagnosis result data for each of the communication terminals; a determination unit configured to determine a usage of the communication terminal based on diagnosis result data of the communication terminal; and a display processing unit configured to perform a process of displaying, on a display unit, information based on the usage determined by the determination unit together with the diagnosed state of the device of the communication terminal.

10 Claims, 11 Drawing Sheets

(56) References Cited

U.S. PATENT DOCUMENTS

| | | | |
|---|---|---|---|
| 2011/0202293 A1* | 8/2011 | Kobraei | G06Q 50/06 |
| | | | 702/62 |
| 2012/0041640 A1* | 2/2012 | Videtich | B60R 1/12 |
| | | | 701/34.4 |
| 2013/0136253 A1* | 5/2013 | Liberman Ben-Ami | H04M 3/5191 |
| | | | 379/265.09 |

FOREIGN PATENT DOCUMENTS

| JP | 2003-348249 | 12/2003 |
|---|---|---|
| JP | 2006-94046 | 4/2006 |

* cited by examiner

FIG.5

| TERMINAL NAME | BUILT-IN CAMERA | BUILT-IN MICROPHONE | BUILT-IN SPEAKER | VIDEO OUTPUT | EXTERNAL MICROPHONE |
|---|---|---|---|---|---|
| CONFERENCE ROOM A | ○ | × | ○ | ○ | ○ |

FIG.6

| TERMINAL NAME | BUILT-IN CAMERA | BUILT-IN MICROPHONE | BUILT-IN SPEAKER | VIDEO OUTPUT | EXTERNAL MICROPHONE |
|---|---|---|---|---|---|
| TERMINAL B | ○ | × | ○ | ○ | - |

FIG.7

| TERMINAL NAME | DATE AND TIME OF RECEIPT | BUILT-IN CAMERA | BUILT-IN MICRO-PHONE | BUILT-IN SPEAKER | VIDEO OUTPUT | EXTERNAL MICRO-PHONE | EXTERNAL CAMERA |
|---|---|---|---|---|---|---|---|
| CONFER-ENCE ROOM A | 201301071725 | ○ | × NO RE-SPONSE | ○ | ○ | ○ | - |
| TERMINAL B | 201301071213 | ○ | × | ○ | ○ | - | - |
| TERMINAL C | 201301071125 | ○ | ○ | ○ | ○ | × | - |
| CONFER-ENCE ROOM A | 201301061435 | ○ | ○ | ○ | ○ | - | - |

FIG.8

| TERMINAL NAME | VIDEO INPUT | VIDEO OUTPUT | AUDIO INPUT | AUDIO OUTPUT |
|---|---|---|---|---|
| CONFERENCE ROOM A | ○ | ○ | ○ | ○ |

FIG.9

| TERMINAL NAME | VIDEO INPUT | VIDEO OUTPUT | AUDIO INPUT | AUDIO OUTPUT |
|---|---|---|---|---|
| TERMINAL B | ○ | ○ | × | ○ |

FIG.10

| USE | VIDEO INPUT | VIDEO OUTPUT | AUDIO INPUT | AUDIO OUTPUT |
|---|---|---|---|---|
| VIDEO CONFERENCE | ○ | ○ | ○ | ○ |
| LECTURE (SPEAKER) | ○ | | ○ | |
| LECTURE (HEARER) | | ○ | | ○ |
| AUDIO CONFERENCE | | | ○ | ○ |

FIG.11

| TERMINAL NAME | VIDEO INPUT | VIDEO OUTPUT | AUDIO INPUT | AUDIO OUTPUT | |
|---|---|---|---|---|---|
| CONFERENCE ROOM A | × | ○ | ○ | ○ | ~L11 |
| TERMINAL B | ○ | ○ | × | ○ | ~L13 |

FIG.13

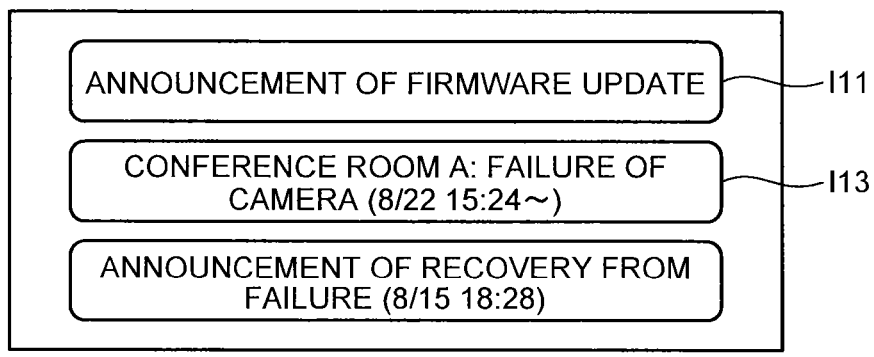

- ANNOUNCEMENT OF FIRMWARE UPDATE — I11
- CONFERENCE ROOM A: FAILURE OF CAMERA (8/22 15:24~) — I13
- ANNOUNCEMENT OF RECOVERY FROM FAILURE (8/15 18:28)

FIG.14

FAILURE NOTICE: CONFERENCE ROOM A: FAILURE OF CAMERA

・DATE AND TIME OF FAILURE: 8/22 15:24~
・CONTENT OF FAILURE: NO RESPONSE FROM DEVICE

・USAGE EXAMPLES:

1. AUDIO CONFERENCE
2. LECTURE USING CONFERENCE ROOM A AS HEARER SIDE
   *CONNECTION OF EXTERNAL CAMERA IS REQUIRED

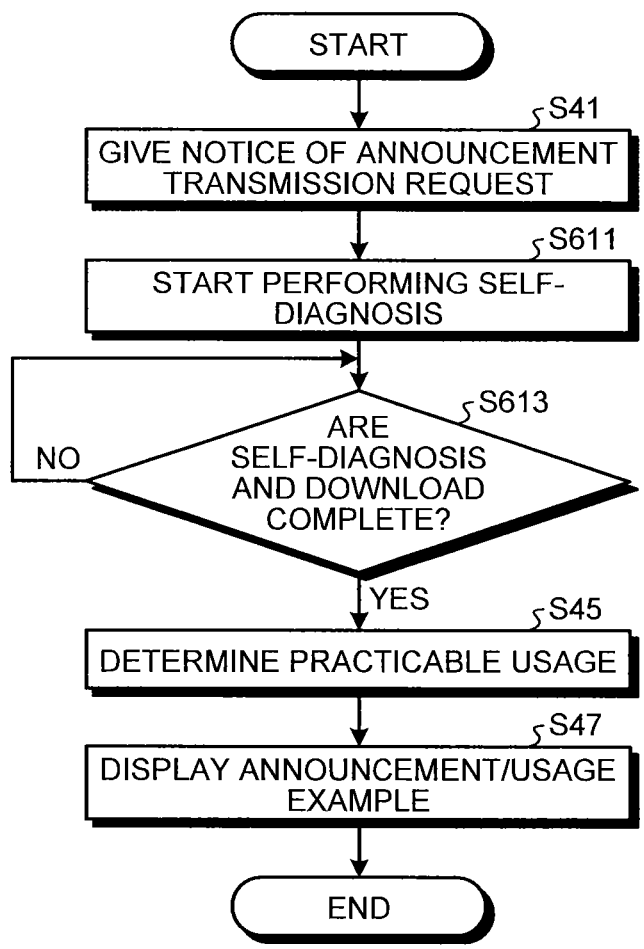

COMMUNICATION SYSTEM, COMMUNICATION TERMINAL, AND COMPUTER PROGRAM PRODUCT

CROSS-REFERENCE TO RELATED APPLICATIONS

The present application claims priority to and incorporates by reference the entire contents of Japanese Patent Application No. 2013-052541 filed in Japan on Mar. 14, 2013.

BACKGROUND OF THE INVENTION

1. Field of the Invention

The present invention relates to a communication system, a communication terminal, and a computer program product.

2. Description of the Related Art

A technology for collecting information (for example, failure information) of a communication terminal connected to communicate via a network and managing the information is conventionally known. For example, Japanese Laid-open Patent Publication No. 2003-348249 discloses a remote centralized management system capable of remotely diagnosing OA equipment, collecting a remote diagnosis result via HTTP, and allowing the remote diagnosis result to be viewed via a Web browser for the purpose of increasing efficiency in the analysis of the diagnosis result of the OA equipment.

However, the technique of Japanese Laid-open Patent Publication No. 2003-348249 is strictly for the purpose of collecting a remote diagnosis result to allow an administrator who operates the remote centralized management system to manage the OA equipment, and is not for the purpose of presenting the remote diagnosis result to a user of the OA equipment. Therefore, it is difficult to make use of the technique for the purposes such as grasping the state of another communication terminal to be a communication partner, for example, when communication is performed between a plurality of communication terminals. Hence, if a failure occurs in communication with another communication terminal, it becomes necessary to make inquiries between users via the administrator or contact directly between the users, for example, which is troublesome.

In view of the above, there is a need to provide a communication system, a communication terminal, and a computer program product that can support the use of the communication terminal to communicate with another communication terminal and improve the convenience of users.

SUMMARY OF THE INVENTION

It is an object of the present invention to at least partially solve the problems in the conventional technology.

A plurality of communication terminals communicate via a communication line in a communication system. The communication system includes: a diagnosis unit configured to diagnose a state of a device built in the communication terminal or a device connected to the communication terminal; a management unit configured to manage diagnosis result data for each of the communication terminals; a determination unit configured to determine a usage of the communication terminal based on diagnosis result data of the communication terminal; and a display processing unit configured to perform a process of displaying, on a display unit, information based on the usage determined by the determination unit together with the diagnosed state of the device of the communication terminal.

A communication terminal is to be connected via a communication line to and communicates with a server configured to manage diagnosis result data for each communication terminal. The communication terminal includes: a diagnosis unit configured to diagnose a state of a device built in the local communication terminal or a device connected to the local communication terminal; a transmission unit configured to transmit, to the server, diagnosis result data by the diagnosis unit; a receiving unit configured to receive the diagnosis result data of the communication terminal transmitted from the server; a determination unit configured to determine a usage of the local communication terminal based on the diagnosis result data by the diagnosis unit and the diagnosis result data of the communication terminal received by the receiving unit; and a display processing unit configured to perform a process of displaying, on a display unit, information based on the usage determined by the determination unit together with the diagnosed state of the device of the communication terminal.

A computer program product includes a non-transitory computer-usable medium having computer-readable program codes embodied in the medium for processing information in a communication terminal, which is connected via a communication line to and communicates with a server configured to manage diagnosis result data for each communication terminal. The program codes when executed cause the communication terminal to function as: a diagnosis unit configured to diagnose a state of a device built in the local communication terminal or a device connected to the local communication terminal; a transmission unit configured to transmit diagnosis result data by the diagnosis unit to the server via the communication line; a receiving unit configured to receive the diagnosis result data of the communication terminal transmitted from the server; a determination unit configured to determine a usage of the local communication terminal based on the diagnosis result data by the diagnosis unit and the diagnosis result data of the communication terminal received by the receiving unit; and a display processing unit configured to perform a process of displaying, on a display unit, information based on the usage determined by the determination unit together with the diagnosed state of the device of the communication terminal.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a diagram illustrating a data configuration example of diagnosis result data;

FIG. 6 is a diagram illustrating a data configuration example of another diagnosis result data;

FIG. 7 is a diagram illustrating a data configuration example of a terminal-by-terminal diagnosis result table;

FIG. 8 is a diagram illustrating a data configuration example of diagnosis result data in a modification;

FIG. 9 is a diagram illustrating a data configuration example of another diagnosis result data in the modification;

FIG. 10 is a diagram illustrating a data configuration example of a use determination table;

FIG. 11 is a diagram illustrating a determination principle of usages;

FIG. 13 is a diagram illustrating an example of an announcement screen;

FIG. 14 is a diagram illustrating an example of a details screen;

FIG. 15 is a flowchart illustrating a processing procedure of the communication terminal in the modification;

DETAILED DESCRIPTION OF THE PREFERRED EMBODIMENTS

Figure 1:
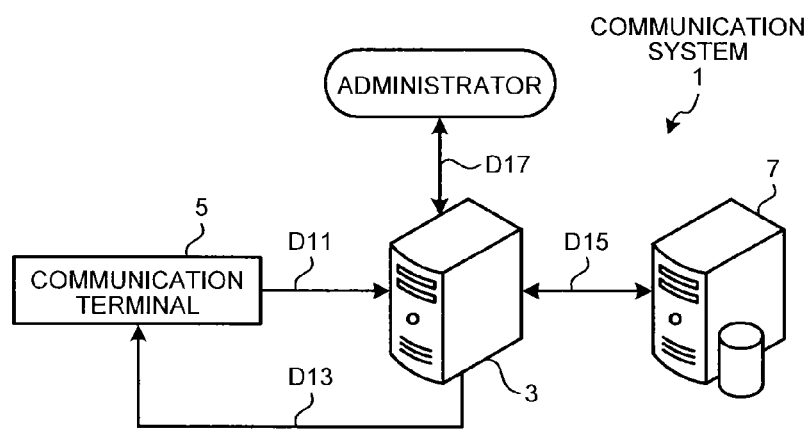
FIG. 1 is a diagram illustrating a configuration example of an entire communication system.

Hereinafter, an embodiment of a communication system, a communication terminal, and a computer program product of the present invention will be described with reference to the drawings. The embodiment shall not limit the present invention. Moreover, the same parts are denoted by the same reference numerals in the drawings.

Embodiment

Figure 2:
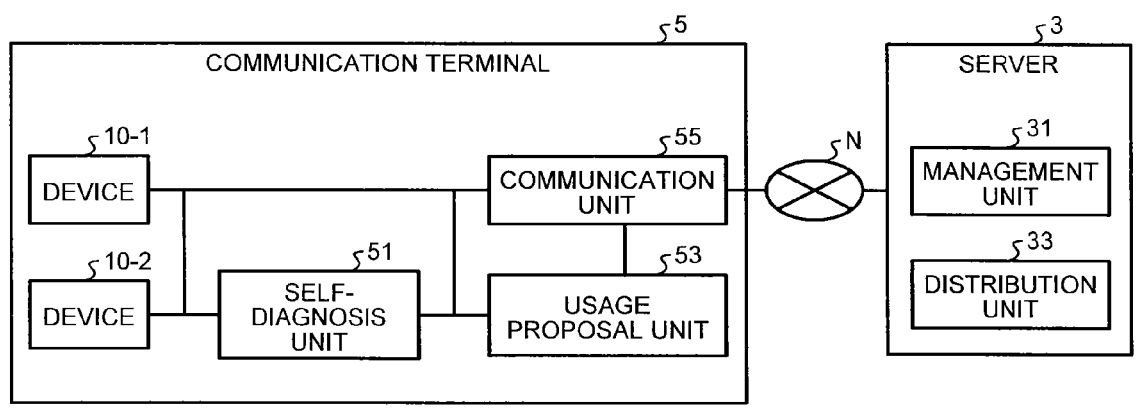
FIG. 2 is a block diagram schematically illustrating configuration examples of a server and a communication terminal.

FIG. 1 is a diagram illustrating a configuration example of an entire communication system 1 of the embodiment. Moreover, FIG. 2 is a block diagram schematically illustrating configuration examples of a server 3 and a communication terminal 5 that configure the communication system 1. As illustrated in FIGS. 1 and 2, the communication system 1 includes the server 3, the communication terminal 5, and a management DB 7, and is configured by connecting the server 3 and the communication terminal 5 via a communication line N to communicate with each other. The communication line N may be any of various communication networks such as a LAN, the Internet, a telephone network, a dedicated line network, and an Intranet. One communication terminal 5 is illustrated in FIGS. 1 and 2. However, practically, one or more communication terminals 5 are connected to and communicate with the server 3.

The embodiment illustrates a case where the communication system 1 is applied to a video conference system that has a video conference by transmitting and receiving video data and audio data between video conference terminals installed in video conference participating locations, and a video conference terminal is assumed to be the communication terminal 5.

In the communication system 1, as illustrated in FIG. 1, the communication terminal 5 uploads diagnosis result data to the server 3 (D11), and the server 3 downloads, to the communication terminal 5, announcement data and diagnosis result data of a target terminal as distribution data (D13). The diagnosis result data and announcement data prepared for all users separately from the diagnosis result data are stored in the management DB 7, and the server 3 writes or reads these data to or from the management DB 7 at any time (D15). Moreover, in the server 3, an administrator refers to the management DB 7, and inputs and outputs data for such things as distribution settings to be described later (D 17). In other words, the administrator performs operations for such things as viewing diagnosis result data of each communication terminal 5 stored in the management DB 7 via a Web browser or the like, and the distribution setting. The administrator includes an administrator of the server 3, a user of the communication terminal 5, an administrator of the entire system including the communication system 1.

As illustrated in FIG. 2, the server 3 includes a management unit 31 and a distribution unit 33 as main functional units. Moreover, in addition, the server 3 includes necessary configurations such as an operating unit (input unit), a display unit, and a recording unit.

The management unit 31 writes the diagnosis result data uploaded from the communication terminal 5 to the management DB 7 and manages the diagnosis result data.

The distribution unit 33 performs processes such as performing distribution setting for each communication terminal 5, reading the diagnosis result data and the announcement data that are stored in the management DB 7 and creating distribution data in accordance with the distribution settings, and transmitting the distribution data to the communication terminal 5 via the communication line N.

On the other hand, the communication terminal 5 is installed on a user side, for example, in a place such as a conference room in a location where a video conference is held. The communication terminal 5 includes a plurality of (two in FIG. 2) devices 10 (10-1, 10-2).

As in the embodiment, if a video conference terminal is assumed to be the communication terminal 5, it is necessary for the communication terminal 5 to include necessary devices for a video conference. These devices are built in the communication terminal 5 or connected to the communication terminal 5. The necessary devices for a video conference include a microphone, a speaker, a camera, and a display that are built in the communication terminal 5 or connected to the communication terminal 5. Hereinafter, the devices built in and connected to the communication terminal 5 are collectively referred to as the device 10 included in the communication terminal 5.

Moreover, the communication terminal 5 includes, as main functional units, a self-diagnosis unit 51 as a diagnosis unit, a usage proposal unit 53 as a determination unit and a display processing unit, and a communication unit 55 as a transmission unit and a receiving unit. Moreover, in addition, the communication terminal 5 includes necessary configurations such as an operating unit (input unit), a display unit, and a recording unit. A hardware configuration of the communication terminal 5 is described below (see FIG. 18).

The self-diagnosis unit 51 is for diagnosing the device 10 included in the communication terminal 5, and creates diagnosis result data based on a state (normal/abnormal) of each diagnosed device 10, and uploads the diagnosis result data to the server 3 via the communication unit 55 and the communication line N.

The usage proposal unit 53 performs a process of displaying, on the display unit, information indicating an announcement and a usage example based on the diagnosis result data created by the self-diagnosis unit 51, the distribution data downloaded from the server 3 via the communication line N and the communication unit 55, and/or the like.

The communication unit 55 is for transmitting and receiving data to and from the server 3, and is realized by a modem, a TA, a jack of a communication cable, a control circuit, or the like.

Next, the flows of processes to be performed by the server 3 and the communication terminal 5 in the communication system 1 will be described. In the embodiment, the communication system 1 manages the results of self-diagnosis performed by the individual communication terminals 5, and presents an announcement to and proposes a usage example to a user.

Figure 3:
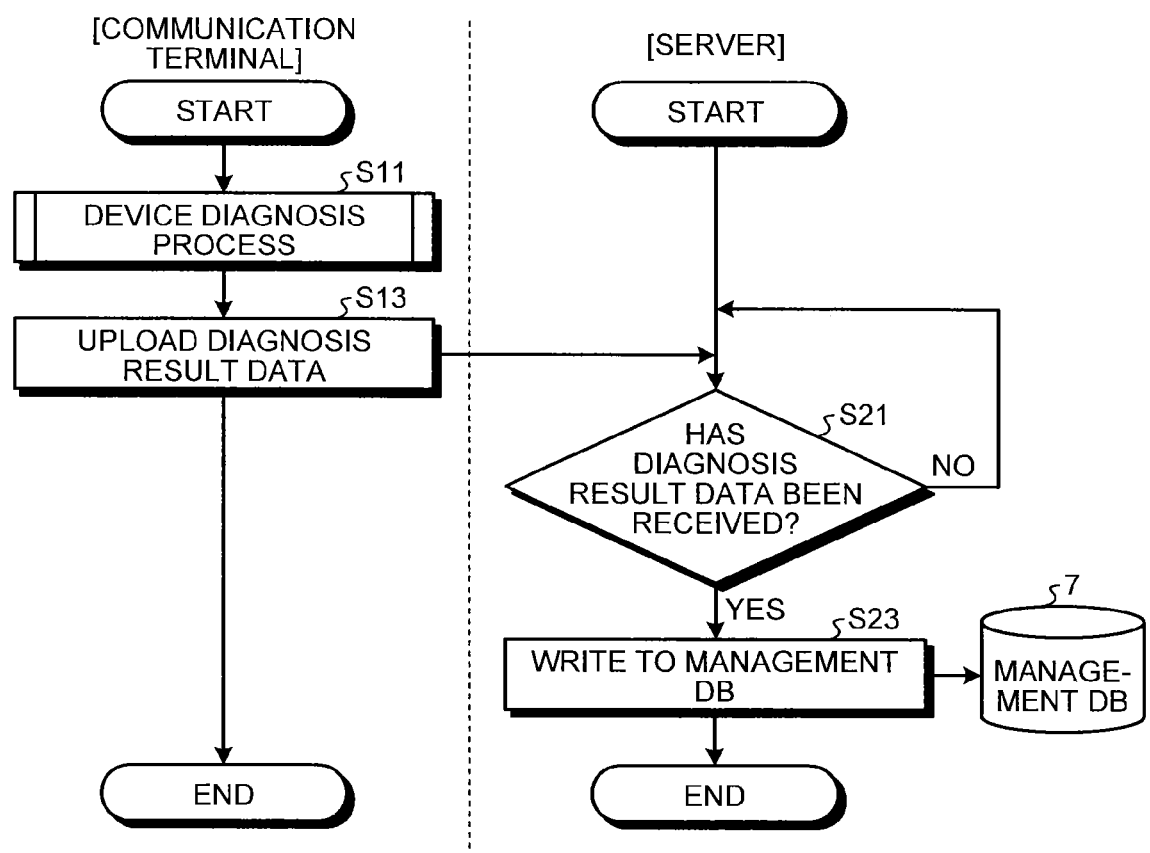
FIG. 3 is a flowchart illustrating processing procedures of the server and the communication terminal.
Figure 4:
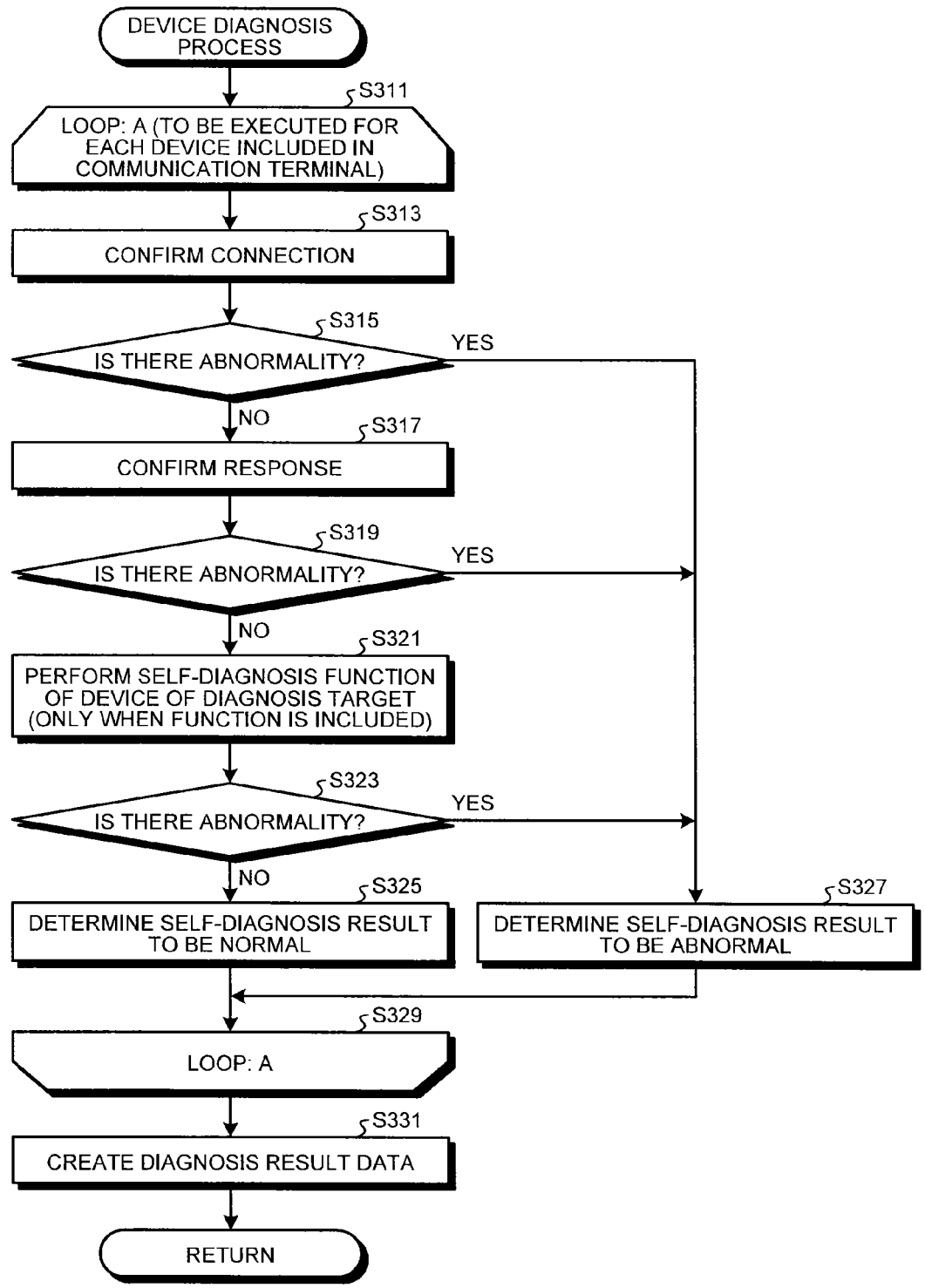
FIG. 4 is a flowchart illustrating a detailed processing procedure of a device diagnosis process.

Firstly, the management of a self-diagnosis result will be described. FIG. 3 is a flowchart illustrating processing procedures of the server 3 and the communication terminal 5 for the management. As illustrated in FIG. 3, in the communication terminal 5, the self-diagnosis unit 51 diagnoses the devices 10 included in the communication terminal 5 in accordance with the procedure for performing self-diagnosis in the left of FIG. 3. Self-diagnosis is performed, for example, at a predetermined execution timing such as at the startup of the communication terminal 5. In other words, the self-diagnosis unit 51 performs a device diagnosis process first (Step S11). FIG. 4 is a flowchart illustrating a detailed processing procedure of the device diagnosis process.

In the device diagnosis process, the self-diagnosis unit 51 sequentially targets the devices 10 included in the communication terminal 5 for diagnosis, and executes processes of a loop A for each device 10 (Steps S311 to S329). That is, in the loop A, the self-diagnosis unit 51 firstly confirms the connection of the device 10 of the diagnosis target (Step S313). If the connection of the relevant device 10 cannot be confirmed, then the self-diagnosis unit 51 determines that there is an abnormality (Step S315: Yes), and shifts to Step S327.

If the connection can be confirmed to find no abnormality (Step S315: No), the self-diagnosis unit 51 confirms a response from the device 10 of the diagnosis target (Step S317). If a response of the relevant device cannot be confirmed, the self-diagnosis unit 51 determines that there is an abnormality (Step S319: Yes), and shifts to Step S327.

If the response can be confirmed to find no abnormality (Step S319: No), the self-diagnosis unit 51 then causes the device 10 of the diagnosis target to perform a self-diagnosis function (Step S321). A device including the self-diagnosis function is conventionally known. In Step S321, if the device 10 of the diagnosis target includes the self-diagnosis function, the self-diagnosis function is performed. If the self-diagnosis function is performed by the device 10 to find an abnormality (Step S323: Yes), the processing shifts to Step S327. If no abnormality is found (Step S323: No), the processing shifts to Step S325. If the device 10 of the diagnosis target does not include the self-diagnosis function, the self-diagnosis unit 51 shifts to Step S325 without performing processes of Steps S321 and S323.

In Step S325, the self-diagnosis unit 51 determines that the device 10 of the diagnosis target is normal and ends the processes of the loop A for the relevant device 10. On the other hand, in Step S327, the self-diagnosis unit 51 determines that the device 10 of the diagnosis target is abnormal, and ends the processes of the loop A for the relevant device 10.

Assume, for example, that the device 10 of the diagnosis target is a USB speaker connected to the communication terminal 5 using USB (Universal Serial Bus). In this case, the self-diagnosis unit 51 firstly acquires a list of USB devices as the process of Step S313 by making a request to acquire the list of USB devices recognized by an OS to the OS. The self-diagnosis unit 51 then searches the acquired list of USB devices for a speaker, and determines that connection is confirmed if the speaker exists while determining that there is an abnormality if it does not exist. Moreover, as the process of Step S317, the self-diagnosis unit 51 waits for the end of a process of setting the operating environment of the USB speaker such as an initialization process, and determines that a response is confirmed if the process ends normally while determining that there is an abnormality if the process does not end normally.

As described above, if the processes of the loop A are performed for all the devices 10 included in the communication terminal 5, the self-diagnosis unit 51 creates diagnosis result data where the states (the self-diagnosis results) of the devices 10 included in the communication terminal 5, the states having been determined to be normal or abnormal in Step S325 or S327, are set (Step S331). The processing subsequently returns to Step S11 of FIG. 3, and shifts to Step S13.

FIGS. 5 and 6 are diagrams illustrating data configuration examples of diagnosis result data. Diagnosis result data created by the communication terminal 5 having a terminal name of "conference room A" is illustrated in FIG. 5. Diagnosis result data created by the communication terminal 5 having a terminal name of "terminal B" is illustrated in FIG. 6. As illustrated in FIGS. 5 and 6, a self-diagnosis result (normal: o/abnormal: x) according to the device 10 is set in the diagnosis result data. It is sufficient if the diagnosis result data contain at least a setting whether each of the devices 10 included in the communication terminal 5 is normal or abnormal, but may contain the content of an abnormality of the abnormal device 10.

In Step S13 of FIG. 3, the self-diagnosis unit 51 uploads, to the server 3, the diagnosis result data created in Step S331 of FIG. 4 together with identification information of the communication terminal 5. Other than a terminal name, a terminal ID uniquely allocated to a local terminal, or the like can be used as the identification information. The created diagnosis result data are also recorded in the recording unit of the local terminal.

On the other hand, if the server 3 receives the diagnosis result data uploaded from the communication terminal 5 (Step S21: Yes), the management unit 31 writes, to the management DB 7, the received diagnosis result data together with a date and time of receipt, and manages them as a terminal-by-terminal diagnosis result table (Step S23).

FIG. 7 is a diagram illustrating a data configuration example of the terminal-by-terminal diagnosis result table. As illustrated in FIG. 7, the diagnosis result data uploaded from the communication terminal 5 are associated with a terminal name and a date and time of receipt, and stored in the diagnosis result table. One record of the diagnosis result table corresponds to diagnosis result data uploaded from the communication terminal 5 having a relevant terminal name on a relevant date and time of receipt (FIGS. 5 and 6).

In this manner, if the diagnosis result data uploaded from the communication terminal 5 are managed with the terminal-by-terminal diagnosis result table, a record is extracted using, for example, a terminal name as a key to make it possible to know a self-diagnosis result of the device 10 of the relevant communication terminal 5 on the latest date and time of receipt. Moreover, if the abnormal device 10 exists, it is also possible to identify how long the abnormality is continued, and the like. For example, when focusing the conference room A in FIG. 7, it can be seen that a built-in microphone of the relevant communication terminal 5 was normal at 14:35 on Jan. 6, 2013, but was abnormal later at 17:25 on Jan. 17, 2013.

Self-diagnosis cannot be performed on a device that is neither built in nor connected to the communication terminal 5. However, if information on devices that should be included in the communication terminal 5 is preset, it is possible to create diagnosis result data that indicate a case where a relevant device is neither built in nor connected as abnormal. For example, a video conference terminal is assumed to be the communication terminal 5 in the embodiment. However, when the communication terminal 5 include no video output device such as a display and a projector, unless a video output device is connected, the communication terminal 5 cannot be used as a video conference terminal. In such a case, it is sufficient if a video output device is set as a device that should be included to create diagnosis result data where a self-diagnosis result is set for each device that should be included. This makes it possible to create diagnosis result data that indicate, for example, a case where the communication terminal 5 does not include a video output device (if connection cannot be confirmed) as abnormal.

It may be configured such that the setting of a device that should be included in the communication terminal 5 and determination of its state is performed on the server 3. For example, if a self-diagnosis result of a device that is set as one that should be included is not contained in the diagnosis result data uploaded from the communication terminal 5, the management unit 31 adds this state as abnormal to the diagnosis result data, and then writes to the management DB 7 to manage the diagnosis result data.

Moreover, the storage format of the diagnosis result data uploaded from the communication terminal 5 is not limited to the terminal-by-terminal diagnosis result table illustrated in FIG. 7. That is, it is sufficient if the storage format of the diagnosis result data has a configuration where diagnosis result data can be recorded for each communication terminal 5 and necessary information can be extracted later.

Moreover, here, the self-diagnosis unit 51 performs self-diagnosis on the communication terminal 5, and creates diagnosis result data where normal or abnormal is set for each device 10. However, the content of the diagnosis result data may be changed as appropriate.

For example, even if there is a device for which the self-diagnosis result is abnormal, there may be no problem in implementing a predetermined function. Specifically, it is sufficient in a use (use form) as a video conference terminal if audio and video can be input into and output from the communication terminal 5. Hence, it may be configured such that information on the functions of the communication terminal 5 is preset.

In this case, the self-diagnosis unit 51, as a creation unit, creates diagnosis result data where normal/abnormal is set for each device. Specifically, if the communication terminal 5 includes a plurality of devices of the same type that can implement a function required for the use, when at least one of them is normal, the self-diagnosis unit 51 creates diagnosis result data in which the function is set to be normal. For example, when an audio input function is required, even if a broken-down microphone is built in or connected to the communication terminal 5, it is sufficient if a normal microphone is built in or connected. Cases such as where the communication terminal 5 includes a built-in camera and an external camera, and where the communication terminal 5 includes a built-in speaker and a headphone are dealt in the same manner.

FIGS. 8 and 9 are diagrams illustrating data configuration examples of diagnosis result data of this case, and illustrate video input, video output, audio input, and audio output as the functions of the communication terminal 5. Specifically, FIG. 8 illustrates diagnosis result data created from the self-diagnosis results of the devices 10 illustrated in FIG. 5. As illustrated in FIG. 5, in the conference room A, although the self-diagnosis result of a built-in microphone is abnormal, an external microphone is normal and accordingly the audio input function can be implemented. In this case, as illustrated in FIG. 8, diagnosis result data where audio input is set as normal are created. Moreover, FIG. 9 illustrates diagnosis result data created from the self-diagnosis results of the devices 10 illustrated in FIG. 6. As illustrated in FIG. 6, in the terminal B, the self-diagnosis result of a built-in microphone is abnormal, and an external microphone is not connected. In this case, as illustrated in FIG. 9, diagnosis result data where the audio input function is set as abnormal are created.

Functions that can be implemented by the communication terminal 5 may be determined on the server 3. For example, the communication terminal 5 creates diagnosis result data (FIGS. 5 and 6) where a self-diagnosis result is set for each device 10 and uploads the diagnosis result data to the server 3. On the other hand, in the server 3, the management unit 31 converts the received diagnosis result data of each device into diagnosis result data where normal/abnormal is set for each function (FIGS. 8 and 9), and then writes to the management DB 7 to manage the diagnosis result data.

If diagnosis result data are created in this manner, functions that can be implemented by individual communication terminals 5 can be determined from the diagnosis result data. Moreover, this makes it possible to perform things such as determining that the communication terminal 5 as a whole is normal as long as the communication terminal 5 can be used for a predetermined use even if there is a device for which the self-diagnosis result is abnormal. For example, it can be determined that the conference room A illustrated in FIG. 8 can be used for a video conference because audio and video can be input into and output from the conference room A, but the terminal B illustrated in FIG. 9 cannot be used for a video conference because audio cannot be input into the terminal B.

Next, presentation of an announcement to and proposal of a usage example to users will be described. Firstly, the outlines of processes to be performed by the server 3 and the communication terminal 5 for the purposes will be described. In presenting an announcement and proposing a usage example, in the server 3, the distribution unit 33 transmits, to the communication terminal 5, announcement data for each individual communication terminals 5 together with diagnosis result data of a target terminal as distribution data.

The announcement data include announcement data prepared for all the users, which do not require information of another terminal, and announcement data regarding the target terminal, which require information of another terminal, and are prepared or created as display screen data that is described in a format that can be interpreted in the communication terminal 5 and can be displayed on the display unit.

The announcement data prepared for all the users include, for example, system update information, information on a service suspension schedule and the like, information on the occurrence of past failures, information on an introduction of a new product, TIPS for the use of a service, service use state information (for example, the achievement of a specified amount in a case of a pay-as-you-go charge), and text data and image data that have contents of things such as a message from the administrator, video data, and audio data, and are stored in the management DB 7. The announcement data prepared for all the users may be configured to be recorded not in the management DB 7 but in the recording unit included in the server 3 itself, or may be configured to be stored in another server that can be connected to and communicate with the server 3.

On the other hand, the announcement data regarding a target terminal are for notifying a self-diagnosis result of another relevant communication terminal 5, and the like, and are created by the distribution unit 33 using the diagnosis result data stored as the terminal-by-terminal diagnosis result table in the management DB 7. For example, the announcement data regarding the target terminal has contents of a cause (content of the failure) of an abnormal device (break-down device) of the target terminal and a date of the occurrence of the abnormality (a date and time of the failure), and/or the like.

In reality, which set of announcement data is included in the distribution data, and which communication terminal 5 is set as a target terminal are preset as the distribution settings for each communication terminal 5. The distribution settings include a setting on items of an announcement to be presented to a user, and a setting of the target terminal. In the setting regarding the items of an announcement, the type of announcement data included in the distribution data is specified for each communication terminal 5. For example, information on a service suspension schedule is included, and information on an introduction of a new product is not included. On the other hand, in the setting of the target terminal, another communication terminal 5 to be the target terminal is specified for each communication terminal 5. For example, the communication terminal 5 of a communication partner (a partner of a video conference) is specified as the target terminal for each communication terminal 5 in each participating location according to the participating location of a scheduled video conference. The distribution setting is performed, for example, by the administrator, but may be configured to be performed by the user.

Moreover, in the communication terminal 5, the usage proposal unit 53 uses diagnosis result data of the target terminal downloaded as the distribution data from the server 3 and determines the practicable usage, at the present point in time, of a local terminal in order to propose a usage example to the user. A determination principle of a usage example will be described here. For example, the usage proposal unit 53 uses a use determination table prerecorded in the recording unit to identify a practicable use in the local terminal and the target terminal. FIG. 10 is a diagram illustrating a data configuration example of the use determination table.

As illustrated in FIG. 10, the use determination table is a data table where necessary functions are set for each use of the communication terminal 5. For example, the functions of video input, video output, audio input, and audio output are required for a video conference. In contrast, the video input function is not required when participating a lecture as a hearer and when participating an audio conference. Accordingly, with the communication terminal 5 in which, for example, the video input function is abnormal, a video conference cannot be held, but a lecture (hearer) and an audio conference can be held. Therefore, in such a case, uses of a lecture (hearer) and an audio conference can be proposed as usage examples. However, in order to actually be a participator of a lecture (hearer) or an audio conference, it is necessary for another communication terminal 5 being the hearer or another communication terminal 5 being a partner of the audio conference to have practicable functions required for the relevant use. Hence, the usage proposal unit 53 uses diagnosis result data of the target terminal downloaded as the distribution data from the server 3 together upon determination of a usage.

Assume here that the terminal name of the local terminal is "terminal B," the terminal name of the target terminal is "conference room A," and the functions illustrated in FIG. 11 can be implemented by each communication terminal 5. A record L11 in FIG. 11 corresponds to the diagnosis result data of the target terminal (conference room A) downloaded from the server 3. Moreover, a record L13 corresponds to the diagnosis result data obtained by self-diagnosis performed by the local terminal (terminal B) at a time such as at immediately previous startup and recorded in the recording unit.

In this case, the usage proposal unit 53 identifies uses that are practicable by the conference room A being the target terminal as a lecture (hearer) and an audio conference, from the diagnosis result data of the record L11 in accordance with the use determination table. Moreover, the usage proposal unit 53 identifies a use that is practicable by the terminal B being the local terminal as a lecture (hearer) from the diagnosis result data of the record L13. The usage proposal unit 53 subsequently checks the identified uses of both and determines a usage that can be proposed. In this example, the terminal B cannot be used for an audio conference, and both of the terminal B and the conference room A cannot be used for a lecture (speaker). Accordingly, it is determined that there is no practicable usage. Consequently, it is possible to exclude an impracticable usage in a combination with the state of the target terminal and to propose, to a user, a usage example that can be reliably performed with the target terminal at the point in time.

As another case, if the audio input function of the terminal B is normal in FIG. 11, uses that are practicable by the terminal B are identified as a video conference, a lecture (speaker), a lecture (hearer), and an audio conference. In this case, the usage proposal unit 53 determines two of an audio conference with the conference room A and a lecture with the conference room A as a hearer as practicable usages for the terminal B.

The usage proposal unit 53 sets practicable usages determined as described above as usage examples, and displays, on the display unit, the announcement data regarding the target terminal downloaded as the distribution data from the server 3 while including information indicating the usage examples in the announcement data. Consequently, an announcement is presented to the user and information indicating proposals of the usage examples is displayed.

Even if a usage is impracticable at the present point in time, as long as there is a usage that becomes practicable by connecting an unconnected external device, it is also possible to propose a usage example together with that information. In this case, information on the types of external devices connectable to the local terminal is preset. The usage proposal unit 53, as a detection unit, then detects the external device unconnected to the local terminal in accordance with the foregoing setting and determines a usage that becomes practicable by connecting the detected unconnected external device. It may be similarly configured such that information on the types of connectable external devices is preset also for another communication terminal 5 that can be a communication partner. In this case, the usage proposal unit 53 detects an unconnected external device in the target terminal and determines a usage that becomes practicable by connecting the detected unconnected external device to the target terminal.

Assume, for example, that if information on the types of connectable external terminals is set in the local terminal and only the audio input function of the terminal B is abnormal as illustrated in FIG. 11, a microphone is set as a connectable external device in the terminal B. If the microphone is connected to the terminal B, and the audio input function becomes normal, practicable uses of the terminal B are to be identified as a video conference, a lecture (speaker), a lecture (hearer), and an audio conference. As a consequence, two of an audio conference with the conference room A, and a lecture with the conference room A as a hearer are determined as practicable usages. Hence, in such a case, it may be configured such that the usage proposal unit 53 displays, on the display unit, information to the effect that the two of an audio conference with the conference room A and a lecture with the conference room A as a hearer become possible to be held by connecting a microphone unconnected to the local terminal, together with information on practicable usage examples, and makes proposals to the user.

On the other hand, assume that if information on the types of connectable external terminals is set in the target terminal and only the video input function of the conference room A is abnormal as illustrated in FIG. 11, a camera is set as a connectable external device in the conference room A. If the camera is connected to the conference room A, and the video input function becomes normal, practicable uses in the conference room A are to be identified as a video conference, a lecture (speaker), a lecture (hearer), and an audio conference. As a consequence, a lecture with the conference room A as a speaker is determined to be practicable usage. Hence, in such a case, it may be configured such that the usage proposal unit 53 displays, on the display unit, information to the effect that a lecture with the conference room A as a speaker becomes possible to be held by connecting a camera unconnected to the target terminal, together with information on practicable usage examples, and makes proposals to the user.

The usage proposal unit 53 may be configured to determine both a usage that becomes practicable by connecting an external device unconnected to the local terminal and a usage that becomes practicable by connecting an external device unconnected to the target terminal. In this case, it is sufficient if information indicating usage examples determined for both to become practicable, together with information indicating practicable usage examples, is displayed on the display unit.

Consequently, if the state of a device of the communication terminal 5 is not abnormal, but the device is simply unconnected, it is possible to propose to a user also usage examples of when the relevant device is connected. Therefore, it is possible to widen a range of proposals of usage examples.

Moreover, the above-described processes to be performed by the usage proposal unit 53 may be configured to be performed not by the communication terminal 5 but by the server 3. In this case, the server 3 sets the determined usage as a usage example, and transmits information indicating the usage example to the communication terminal 5, including information indicating the usage example in announcement data regarding the target terminal. In the modification, there is no need to include the usage proposal unit 53 in the communication terminal 5, and it is sufficient if display screen data transmitted as the announcement data regarding the target terminal from the server 3 is simply displayed on the display unit. In this case, if the server 3 detects an unconnected external device in the communication terminal 5, it is sufficient if information on the types of external devices connectable to each communication terminal is preset for each communication terminal.

Figure 12:
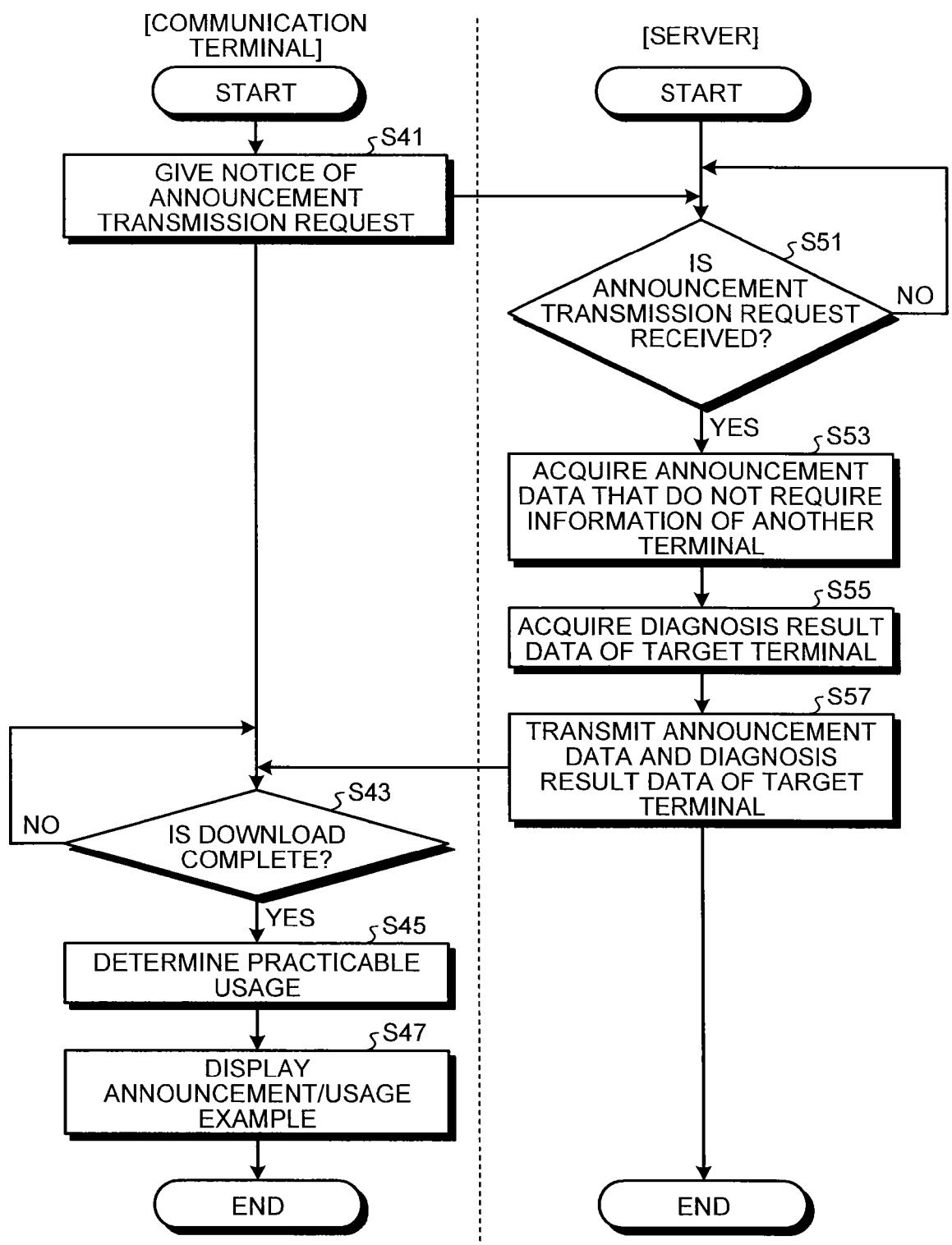
FIG. 12 is a flowchart illustrating other processing procedures of the server and the communication terminal.

FIG. 12 is a diagram illustrating processing procedures of the server 3 and the communication terminal 5 for the communication system 1 presenting an announcement to a user and proposing a usage example. As illustrated in FIG. 12, firstly, the communication terminal 5 notifies the server of an announcement transmission request (Step S41).

If the server 3 receives the announcement transmission request from the communication terminal 5 (Step S51: Yes), the distribution unit 33 refers to the management unit DB 7 and acquires the announcement data prepared for all the users, which do not require the information of another terminal (Step S53) as well as acquires diagnosis result data of the target terminal (Step S55), in accordance with the distribution settings of the relevant communication terminal 5.

Specifically, in Step S53, the distribution unit 33 extracts announcement data to be included in the distribution data from the announcement data stored in the management DB 7 in accordance with the setting of the relevant communication terminal 5 regarding the items of an announcement to be presented to the user. On the other hand, in Step S55, the distribution unit 33 extracts the diagnosis result data of the target terminal stored in the terminal-by-terminal diagnosis result table of the management DB 7 in accordance with the setting of the target terminal. Moreover, upon extracting the diagnosis result data of the target terminal, the distribution unit 33 creates announcement data regarding the target terminal in the above manner.

The extracted diagnosis result data may be all records where the terminal name of the target terminal is associated or only necessary records may be extracted from them. Moreover, the processes of Steps S53 and S55 may be performed in parallel, or a processing procedure may be configured to perform the process of Step S55 first and then the process of Step S53.

The distribution unit 33 then sets the announcement data for all the users acquired in Step S53 and the announcement data regarding the target terminal created in Step S55, as the announcement data, and transmits, to the relevant communication terminal 5, the announcement data together with the diagnosis result data of the target terminal acquired in Step S55 as the distribution data (Step S57). It is not particularly necessary for the announcement data for all the users acquired in Step S53 to be processed upon including the announcement data in the distribution data.

On the other hand, if the download of the distribution data transmitted from the server 3 as described above is complete in the communication terminal 5 (Step S43: Yes), the usage proposal unit 53 determines the usage of the local terminal that is practicable at the present point in time in the above manner (Step S45). The usage proposal unit 53 then sets, as a usage example, the usage that was determined to be practicable in Step S45, and performs a process of displaying information indicating the usage example together with an announcement on the display unit (Step S47).

In Step S47, the usage proposal unit 53 adds the information indicating the usage example to the announcement data regarding the target terminal and then displays, on the display unit, an announcement screen together with the announcement data for all the users and a details screen that can transition from the announcement screen. FIG. 13 is a diagram illustrating an example of the announcement screen. The titles of announcements having contents such as announcement data downloaded from the server 3, in other words, the announcement data for all the users, the announcement data regarding the target terminal, and the like are arranged and displayed in a selectable manner on the announcement screen. The announcement screen illustrated in FIG. 13 is an example, and, it may be configured such that, for example, only the announcement data regarding the target terminal is displayed or the announcement data regarding the target terminal is not displayed. For example, it can be achieved by previously performing a display setting on how to display announcements. The display setting may be configured to be performed by the administrator, for example, on the server 3, or by the user on the communication terminal 5.

If an operation of selecting the title of the announcement is performed on the announcement screen, its detail information is displayed. For example, the detail information of a firmware update announcement I11 at the top corresponds to the announcement data for all the users. If the announcement I11 is clicked, the date of update, the content of update, and/or the like for updatable firmware are displayed.

On the other hand, the detail information of an announcement 113 in the middle corresponds to the announcement data regarding the target terminal to which the information indicating the usage example has been added. FIG. 14 is a diagram illustrating a details screen example to be displayed when the announcement 113 is clicked. A break-down device of the conference room A being the target terminal, a date and time of the failure, the content of the failure, and/or the like are displayed on the details screen. FIG. 14 illustrates the content of the failure of the camera of the conference room A occurred after 15:24 on August 22. Moreover, the information indicating the usage example is displayed together on the details screen. Usage example 2 illustrated in FIG. 14 is information indicating a usage example that becomes practicable by connecting an unconnected external device, and information to the effect that connection of an external camera is required is clearly described together. In addition, the details screen may include the contact information of the administrator, and/or the like as appropriate.

As described above, according to the embodiment, it is possible in the server 3 to manage diagnosis result data of self-diagnosis performed on the communication terminal 5 for each communication terminal 5. The server 3 can transmit diagnosis result data of a target terminal, including the diagnosis result data in the distribution data, to a relevant communication terminal 5 upon being notified of an announcement transmission request by the communication terminal 5. On the other hand, it is possible in the communication terminal 5 to determine a usage of a local terminal that is practicable at the present point in time with the diagnosis result data of the target terminal transmitted from the server 3, and display, on the display unit, information indicating a usage example, setting the practicable usage as the usage example, together with the state of a device of the target terminal (diagnosis result data). Hence, the usage example of the local terminal at the present point in time can be presented to a user. Consequently, the user himself/herself does not need to think of a usage of the communication terminal 5. Moreover, the user may not be able to come up with a usage if the user himself/herself thinks. Even in such a case, a usage of the local terminal can be appropriately proposed to the user. In addition, even if the local terminal cannot be used for an originally planned use since a device of the target terminal is abnormal, it is possible to know that information without requiring advance contact. Accordingly, the administrator and the user can save trouble. Therefore, it is possible to support the use of a communication terminal that communicates with another communication terminal and improve the convenience of users.

For example, consider a case where in a video conference system to which the communication system 1 is applied, a user X operates the communication terminal 5 having the terminal name of "terminal B," and has a video conference with the communication terminal 5 having the terminal name of "conference room A," and a camera of the conference room A is broken. In this case, the user X of the terminal B cannot see the video of the conference room A. However, in a known video conference system, a user of the conference room A or the administrator needs to specially contact the user X about the failure of the camera of the conference room A in order for the user X to know the failure of the camera in advance. In contrast, according to the communication system 1 of the embodiment, even if there is no special contact that is required, the user X can participate the conference, knowing from the beginning that it will be an audio conference, by viewing the announcement screen of FIG. 13 and the details screen of FIG. 14. Alternatively, the user X can request the user of the conference room A in advance to use another communication terminal including no break-down device.

In the embodiment, the communication terminal 5 is configured to perform self-diagnosis at startup as an execution timing. In contrast, the execution timing of self-diagnosis may be a timing other than at startup. For example, it may be configured such that the administrator manually gives an implementation instruction to the communication terminal 5, or the server 3 automatically gives an instruction to the communication terminal 5 by a program. In this case, the communication terminal 5 performs self-diagnosis in response to a notification of the implementation instruction from the server 3. Moreover, it may be configured such that the communication terminal 5 accepts an implementation instruction operation by a user, and self-diagnosis is performed in response to the implementation instruction operation.

Alternatively, it may be configured such that another timing other than at startup is preset as the execution timing, and self-diagnosis is performed. For example, it may be configured such that self-diagnosis is performed in parallel with the download of the distribution data. FIG. 15 is a flowchart illustrating a processing procedure of the communication terminal 5 in this case. In FIG. 15, the same reference numerals are assigned to process steps similar to FIG. 12 and their descriptions are omitted.

In the modification, as illustrated in FIG. 15, the communication terminal 5 notifies the server 3 of an announcement transmission request (Step S41), and at the same time, the self-diagnosis unit 51 starts performing self-diagnosis (Step S611). FIG. 15 does not illustrate the processing procedure of the server 3. However, the server 3 performs the processes of Steps S51 to S57 illustrated in FIG. 12 and described in response to the notification of Step S41. Moreover, the implementation of self-diagnosis, which starts in Step S611 of FIG. 15, can be achieved by the server 3 and the communication terminal 5 performing the processes in accordance with the processing procedures illustrated in FIG. 3.

Afterward, the communication terminal 5 completes the implementation of self-diagnosis, which started in Step S611, and waits for the completion of the download of the distribution data (Step S613: No). When they are complete (Step S613: Yes), the processing shifts to Step S45. In the modification, when the usage proposal unit 53 determines a practicable usage in Step S45, it becomes possible to propose a usage example in accordance with an immediately previous self-diagnosis result of the local terminal.

Moreover, also in terms of a distribution timing of the distribution data from the communication terminal 5 to the server 3, and display timings of the announcement screen, the details screen, and the like, it may be configured such that setting is appropriately performed or instructions are appropriately given as in the execution timing of self-diagnosis.

Moreover, the embodiment describes the case where the diagnosis result data of a target terminal is used together with the diagnosis result data of a local terminal to determine a practicable usage on the local terminal and propose a usage example. In contrast, it may be configured such that a usage that can be determined from only the diagnosis result data of the local terminal is determined to be practicable by the local terminal alone, and the usage is proposed as a usage example. For example, it can be applied to cases such as where communication via the communication line N cannot be established due to a communication failure or the like, and the diagnosis result data of the target terminal cannot be downloaded from the server 3. However, even if communication via the communication line N can be established, there is also, for example, a case where the communication terminal 5 is used for a use by the local terminal alone. It can be applied also in such a case.

Figures 16, 17:
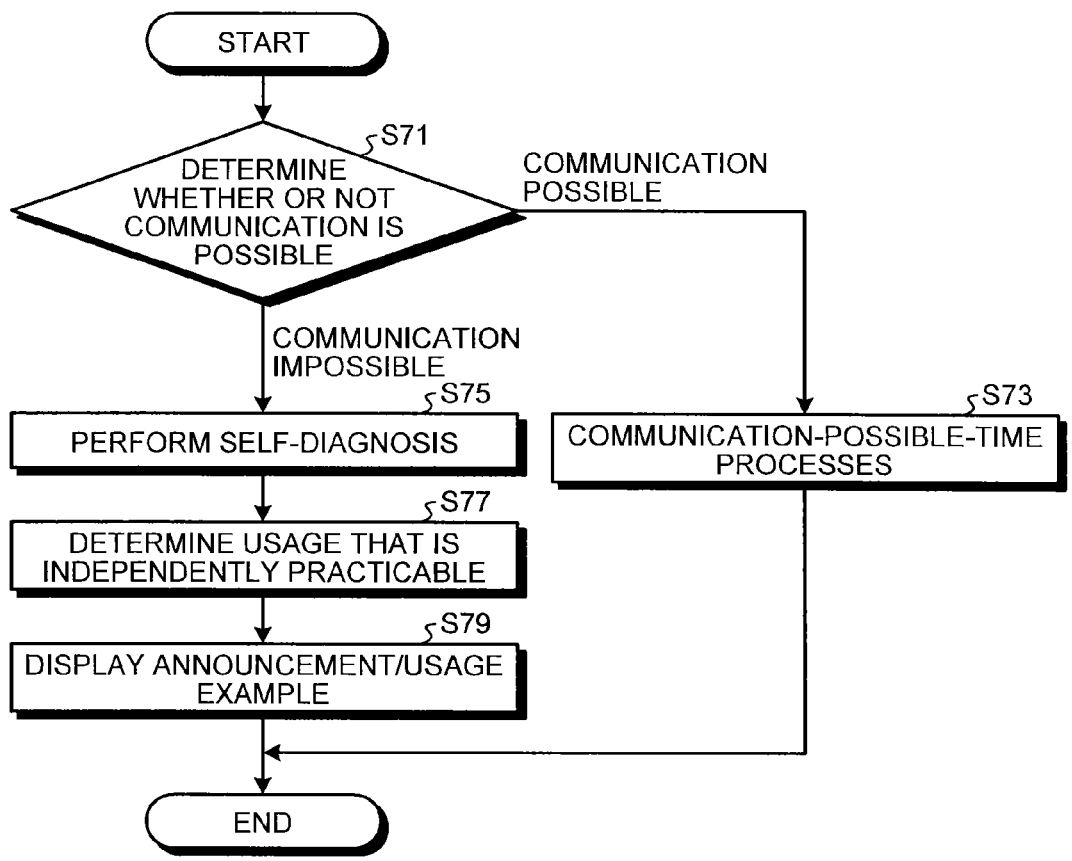
FIG. 16 is a flowchart illustrating a processing procedure of the communication terminal in the modification.
FIG. 17 is a diagram illustrating an example of the details screen in the modification.

FIG. 16 is a flowchart illustrating a processing procedure of the communication terminal 5 in this case. As illustrated in FIG. 16, firstly, the communication terminal 5 performs a process of establishing communication with the server 3 and determines whether or not communication via the communication line N is possible (Step S71). If communication has been established and communication via the communication line N is possible, the processing shifts to Step S73 to perform communication-possible-time processes. The communication-possible-time processes are, for example, the processes illustrated in FIG. 15.

On the other hand, if communication cannot be established with the server 3 and communication via the communication line N is impossible, the processing shifts to Step S75 and the self-diagnosis unit 51 performs self-diagnosis. It can be achieved by the server 3 and the communication terminal 5 performing the processes in accordance with the processing procedures illustrated in FIG. 3.

Next, the usage proposal unit 53 uses the diagnosis result data obtained by self-diagnosis performed in Step S75 to determine a usage that is practicable by the local terminal alone at the present point in time (Step S77). For example, a data table where functions necessary for a use that can be performed by the local terminal alone are set is prerecorded as a lone use determination table in the recording unit. The usage proposal unit 53 then identifies a use that is practicable by the local terminal from the diagnosis result data obtained in Step S75 in accordance with the lone use determination table, and determines the identified use as a usage that is practicable by the local terminal alone.

The usage proposal unit 53 then sets, as a usage example, the usage determined in Step S77 to be practicable, and performs the process of displaying, on the display unit, information indicating the usage example together with an announcement (Step S79). For example, the usage proposal unit 53 creates announcement data regarding the local terminal for notifying a self-diagnosis result of the local terminal using the diagnosis result data obtained in Step S75. The announcement data regarding the local terminal have contents such as a cause (failure content) of an abnormal device (break-down device) of the local terminal, and a date of the occurrence of the abnormality (a date and time of the failure). The usage proposal unit 53 then sets, as a usage example, the usage that was determined in Step S77 to be practicable, adds information indicating the usage example to announcement data regarding the local terminal, creates display screen data (the details screen), and displays the display screen data regarding the display unit.

FIG. 17 is a diagram illustrating an example of the details screen in the modification. Information indicating a usage example by a local terminal alone together with a breakdown device of the local terminal, a date and time of the failure, the content of the failure, and/or the like is displayed on the details screen of this case. For example, if a video conference terminal is assumed to be the communication terminal 5, when communication via the communication line N is impossible, a video conference cannot be held. Even in such a case, as in video recording illustrated in FIG. 17, a use that is practicable by the local terminal alone exists depending on the combination of normal devices or functions of the local terminal. According to the modification, for example, even if communication via the communication line N cannot be performed and communication with the server 3 cannot be established so that diagnosis result data of a target terminal cannot be received, it is possible to determine a usage that is independently practicable by the local terminal and propose the usage as a usage example to a user.

Moreover, in the embodiment, the description is given of the case where a video conference terminal is assumed to be the communication terminal 5 and the communication system 1 is applied to a video conference system. However, the application target is not limited to this, but it can be widely applied to a case where the states of devices included in the communication terminal are managed for each communication terminal.

Moreover, it may be configured such that the processes described as being performed by the server 3 in the embodiment are performed by the communication terminal 5, or it may be configured such that the processes described as being performed by the communication terminal 5 are performed by the server 3. Moreover, the system configuration having been described in the embodiment where the server 3 is connected to and communicates with the communication terminal 5 is an example, and naturally, there are various system configuration examples according to the uses and purposes. For example, a plurality of servers may configure the communication system, and a sharing of the processes to be performed by the servers is not particularly limited.

Figure 18:
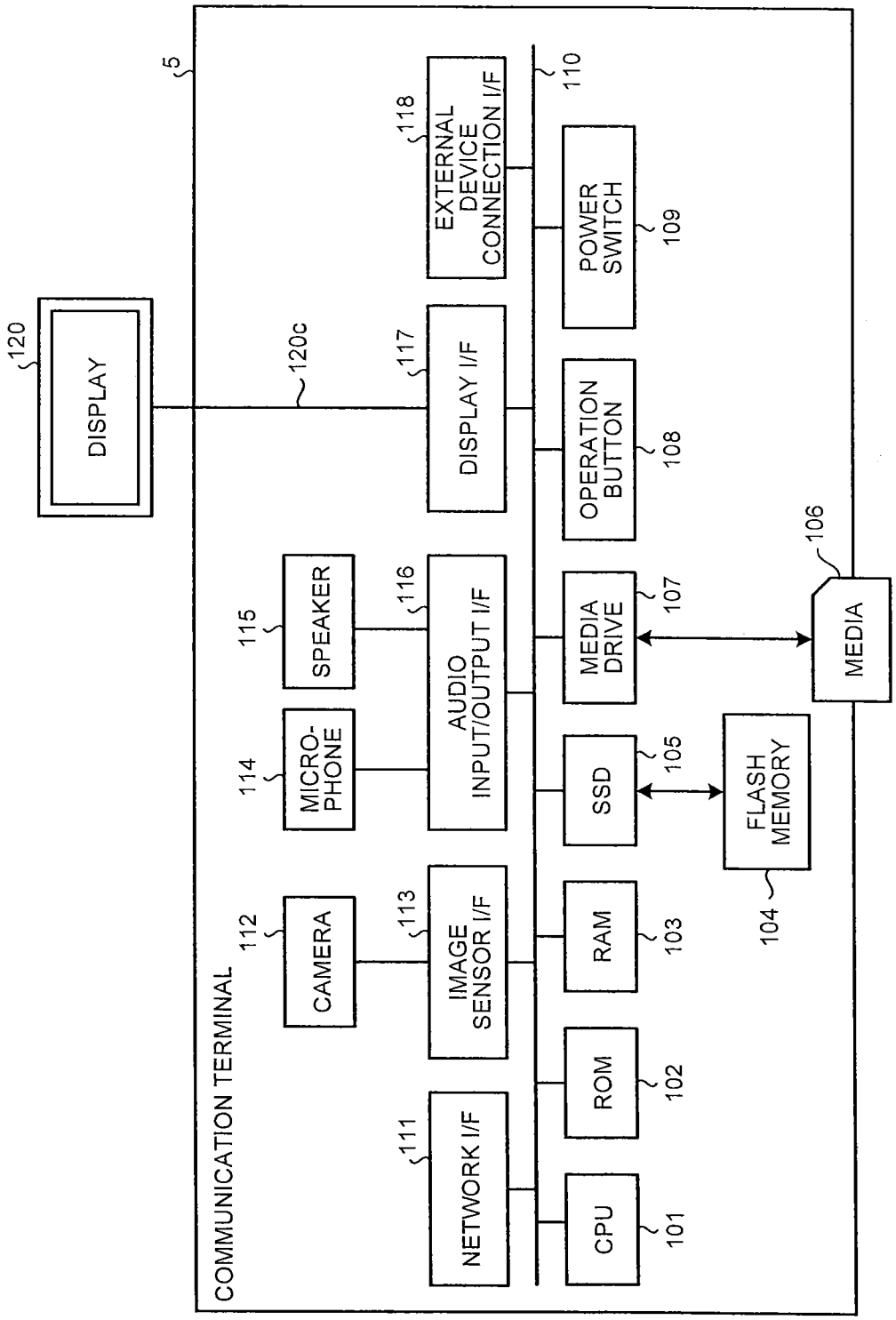
FIG. 18 is a block diagram illustrating a hardware configuration example of the communication terminal.

A description will be given of a hardware configuration example for realizing the above-described communication terminal 5 with reference to FIG. 18. As illustrated in FIG. 18, the communication terminal 5 includes a CPU (Central Processing Unit) 101 that controls the operation of the entire communication terminal 5, ROM (Read Only Memory) 102 where various programs for operating the communication terminal 5, such as a terminal program, are recorded, RAM (Random Access Memory) 103 that is used as a workarea of the CPU 101, flash memory 104 where various pieces of data are recorded, an SSD (Solid State Drive) 105 that controls the wiring or reading of various pieces of data to or from the flash memory 104 in accordance with the control of the CPU 101, a media drive 107 that controls the wiring or reading of data to or from a media 106 such as flash memory, an operation button 108 for inputting various operations, a power switch 109 for switching between ON and OFF of the power of the communication terminal 5, and a network I/F (Interface) 111 for transmitting and receiving data to and from the outside (for example, the server 3) via the communication line N.

Moreover, the communication terminal 5 includes a built-in camera 112 that captures an image of a subject in accordance with the control of the CPU 101 and obtains image data, an image sensor I/F 113 that controls the drive of the camera 112, a built-in microphone 114 that inputs audio, a built-in speaker 115 that outputs audio, an audio input/output I/F 116 that processes the input and output of an audio signal from and to the microphone 114 and the speaker 115 in accordance with the control of the CPU 101, a display I/F 117 that transmits image data to an external display 120 (connected to the communication terminal 5) in accordance with the control of the CPU 101, an external device connection I/F 118 for connecting various external devices, and a bus line 110 such as an address bus and a data bus for electrically connecting the above components.

The display 120 is a display device configured by a liquid crystal or an organic EL. Moreover, the display 120 is connected to the display I/F 117 by a cable 120c. The cable 120c may be a cable for an analog RGB (VGA) signal, a cable for component video, or a cable for an HDMI (High-Definition Multimedia Interface) or DVI (Digital Video Interactive) signal.

The camera 112 includes a lens and a solid-state image sensor that converts light into electric charge and makes an image (video) of a subject electronic. A CMOS (Complementary Metal Oxide Semiconductor), a CCD (Charge Coupled Device), or the like is used as the solid-state image sensor.

External devices such as an external camera, an external microphone, and an external speaker can be electrically connected to the external device connection I/F 118 by a USB (Universal Serial Bus) cable or the like.

The media 106 is configured to be detachable from the communication terminal 5. Moreover, as long as it is nonvolatile memory that allows data to be written or read in accordance with the control of the CPU 101, it is not limited to the flash memory 104 but EEPROM (Electrically Erasable and Programmable ROM) or the like may be used.

The hardware configuration illustrated in FIG. 18 is an example. It is not necessary for the communication terminal 5 to include all the configurations illustrated in FIG. 18. Assume, for example, that the camera 112, the microphone 114, and the like are unnecessary as functions expected of the communication terminal 5. In this case, the communication terminal 5 may have a hardware configuration excluding them. Moreover, FIG. 18 illustrates the external display 120. However, it may be a hardware configuration including a built-in display. For example, the communication terminal 5 can use a general-purpose computer such as a workstation or a personal computer, a smartphone, a tablet-type terminal, or the like as appropriate.

Moreover, the hardware configuration of the server 3 is not illustrated, but can be realized by a computer or the like having a known hardware configuration including such things as an operating unit such as a CPU, a main recording device, ROM where various programs for operating the server 3, such as a server program, are recorded, recording devices such as a hard disk and various recording media, a communication device, output devices such as a display device and a printing device, an input device, and an interface device that connects each unit, or connects an external input.

Moreover, the server program and the terminal program that are executed by the server 3 and the communication terminal 5, which have the above-mentioned hardware configurations, may be configured to be recorded in a computer readable recording medium (for example, the media 106 of the communication terminal 5) in an installable format or executable format, and to be provided. Examples of the recording medium include a CR-ROM, a flexible disk (FD), a CD-R, and a DVD (Digital Versatile Disk). Alternatively, the server program and the terminal program may be configured to be provided by being stored in a computer connected to a communication line such as the Internet and downloaded via the communication line. Moreover, the server program and the terminal program may be configured to be provided or distributed via a communication line such as the Internet.

The terminal program has a module configuration including the functional units illustrated in FIG. 2, and is configured such that the CPU 101 reads the terminal program from the ROM 102 and executes the terminal program and accordingly the self-diagnosis unit 51 and the usage proposal unit 53 are loaded onto the main memory to be generated on the main memory.

However, not limited to the case where the functional units illustrated in FIG. 2 are realized by the implementation of the software (the server program and the terminal program), but for example, a part or all of the functional units illustrated in FIG. 2 may be realized by the implementation of hardware.

According to an embodiment, it is possible to determine a usage of the communication terminal depending on the state, at the present point in time, of each of the communication terminals that is to communicate with each other and present a user with the usage as a usage example. Therefore, the embodiment provides an effect that the use of the communication terminal that communicates with another communication terminal can be supported and the convenience of users can be improved.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A communication system in which a plurality of communication terminals communicate via a communication line, the communication system comprising:
circuitry configured to
diagnose a state of a device built in a communication terminal of the plurality of communication terminals or a device connected to the communication terminal,
manage diagnosis result data for each of the plurality of communication terminals,
determine an available function of the communication terminal based on the diagnosis result data of the device,
display the availability information of one or more uses of the communication terminal together with the diagnosed state of the device of the communication terminal,
detect an unconnected external device in the communication terminal in accordance with the diagnosis result data and based on a type of external device preset as connectable to the communication terminal, determine a usage that becomes practicable by connecting the unconnected external device detected, and display information based on the usage determined to be practicable.

2. The communication system according to claim wherein the plurality of communication terminals include at least a first communication terminal and a second communication terminal to be a communication partner of the first communication terminal, and the circuitry identifies a use of the first communication terminal that is practicable by an available device included in the first communication terminal as well as identifies a use of the second communication terminal that is practicable by an available device included in the second communication terminal, and determines the practicable usage from a combination of the respective practicable uses of the first and second communication terminals.

3. The communication system according to claim 1, wherein the circuitry is further configured to:

create, based on a diagnosis result, the diagnosis result data where, upon at least one of the devices having the same type of function being available, the function is set as available, and where, upon all of the devices having the same type of function being not available, the function is set as not available, wherein the plurality of communication terminals includes at least a first communication terminal and a second communication terminal to be a communication partner of the first communication terminal, and circuitry identifies a use of the first communication terminal that is practicable by an available function of the first communication terminal as well as identifies a use of the second communication terminal that is practicable by an available function of the second communication terminal, and determines the practicable usage from a combination of the respective practicable uses of the first and second communication terminals.

4. The communication system according to claim 1, wherein the circuitry is further configured to:

generate an announcement message indicative of the availability list of every communication terminal within the communication system; and transmit the announcement message to one or more communication terminal within the communication system.

5. The communication system according to claim 4, wherein the announcement further includes information on a service suspension schedule.

6. The communication system according to claim 1, wherein when a first device within the communication terminal is determined to be unavailable, a functionality of the communication terminal remains available if a second device, comparable to the first device, is determined to be available.

7. The communication system according to claim 1, wherein the circuitry is further configured to determine a shared practicable use between the communication terminal and a target terminal from among the plurality of communication terminals.

8. A communication terminal to be connected via a communication line to and communicate with a server configured to manage diagnosis result data for each of a plurality of communication terminals, the communication terminal comprising:

circuitry configured to diagnose a state of a device built in the communication terminal or a device connected to the communication terminal, transmit, to the server, diagnosis result data, receive the diagnosis result data of the communication terminal transmitted from the server, determine an available function of the communication terminal based on the diagnosis result data of the device, display the availability information of one or more uses of the communication terminal together with the diagnosed state of the device of the communication terminal, detect an unconnected external device in the communication terminal in accordance with the diagnosis result data and based on a type of external device preset as connectable to the communication terminal, determine a use that becomes practicable by connecting the unconnected external device detected, and display information based on the use determined to be practicable.

9. The communication terminal according to claim 8, wherein upon commination via the communication line being impossible, the circuitry determines a usage that is practicable by the communication terminal alone based on the diagnosis result data, and displays information based on the usage determined to be practicable by the communication terminal alone together with the diagnosed state of the device of the communication terminal.

10. A non-transitory computer-readable medium encoded with computer readable instruction thereon for processing information in a communication terminal, which is connected via a communication line to and communicates with a server configured to manage diagnosis result data for each of a plurality of communication terminals, wherein the computer readable instructions when executed by circuitry, cause the circuitry to perform a method comprising:

diagnosing a state of a device built in the communication terminal or a device connected to the communication terminal;

transmitting diagnosis result data to the server via the communication line;

receiving the diagnosis result data of the communication terminal transmitted from the server;

determining an available function of the communication terminal based on the diagnosis result data of the device;

displaying the availability information of one or more uses of the communication terminal together with the diagnosed state of the device of the communication terminal;

detecting an unconnected external device in the communication terminal in accordance with the diagnosis result data and based on a type of external device preset as connectable to the communication terminal;

determining a use that becomes practicable by connecting the unconnected external device detected; and displaying information based on the use determined to be practicable.

* * * * *